Figure 1:
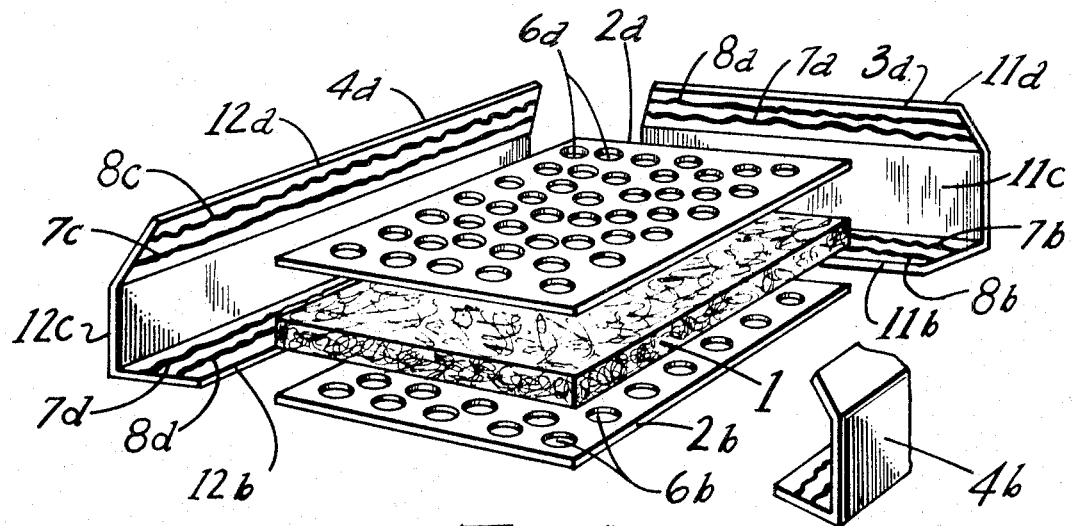

United States Patent [19]

Jackson

[11] 3,747,773

[45] July 24, 1973

[54] DUAL GLUING FILTER

[76] Inventor: Robert L. Jackson, Louisville, Ky.

[22] Filed: Sept. 27, 1971

[21] Appl. No.: 183,789

[52] U.S. Cl........ 210/495, 55/514;518, 55/DIG. 31, 156/291;309
[51] Int. Cl............................................ B01d 27/08
[58] Field of Search..................... 55/DIG. 31, 514, 55/518; 156/309, 291; 210/495

[56] References Cited
UNITED STATES PATENTS

| | | | |
|---|---|---|---|
| 2,715,453 | 8/1955 | Lange | 55/DIG. 31 |
| 2,929,544 | 3/1960 | Herschler | 156/291 |
| 2,965,197 | 12/1960 | Dow et al. | 55/514 |
| 2,975,091 | 3/1961 | Tobey | 161/38 |
| 3,003,581 | 10/1961 | Greason | 55/514 |
| 3,313,218 | 4/1967 | Nichol | 156/309 |

*Primary Examiner*—Bernard Nozick
*Attorney*—Ralph B. Brick, Charles G. Lamb et al.

[57] ABSTRACT

A fluid treating filter arrangement including a filter frame enclosing two retaining screens with filter media disposed therebetween, at least one of the retaining screens being attached to the frame by two types of adhesives, the adhesives utilized being a fast setting and a slow setting adhesive.

6 Claims, 2 Drawing Figures

PATENTED JUL 24 1973

3,747,773

INVENTOR.
BY Robert L. Jackson
Charles G. Lamb
ATTORNEY.

DUAL GLUING FILTER

BACKGROUND OF THE INVENTION

The present invention relates to a fluid treating filter. It is particularly concerned with the use of two types of adhesives in the preparation of fluid treating filters. More particularly, it relates to an improved fluid treating filter utilizing a fast setting adhesive and a slow setting adhesive in bonding filter media retaining screens to a filter frame.

In preparation of fluid treating filters of the type which are prepared by inserting a fibrous material, such as a fibrous glass filter mat, between two perforated retaining sheets of metal, such as bottle cap residue, and then holding the perforated sheets together by an inwardly facing U-channel constructed chipboard filter frame, adhesives which set up quickly and are exposed to a range of temperatures from −10°F to 140°F and are capable of withstanding shock occurring from warehouse handling and operation in a fluid stream are necessary. However, presently in the preparation of filters of the aforementioned type, a single adhesive which accomplishes the aforementioned and is feasible, economically, has not been found. That is, adhesives which set up quickly, are effective over a wide temperature range, and which withstand shock in handling and operating conditions have not been found. The adhesives that are presently in use generally solve the problem of quick setting but have not been found to be dependable over the aforementioned temperature range or to withstand shock occurring from handling and operating conditions. The presently used fast setting adhesives generally are of the "hot melt" type. That is, they are applied while hot and upon chilling harden to form a bond between the dissimilar materials. The maximum bond developed between a chipboard filter frame, the most common type of filter frame, and the metal retaining screens is generally in the room temperature range as this is the temperature to which most of these filters are exposed. However, it has been found that during extremely low temperatures, handling in warehouses, shipping, and the like, these "shocks" shatter the adhesive lines. Furthermore, elevated temperatures result in the adhesive line opening as the adhesive becomes soft and pliable. Thus, adhesives which are economically feasible for usage in the preparation of the aforementioned filters and which will be both fast setting and yet durable over a wide temperature range while at the same time preventing the chipboard frame from separating from the retaining screen under handling or operating conditions has been widely sought.

SUMMARY OF THE INVENTION

In the present invention, it is recognized that it is desirable to provide an adhesive for joining a filter frame to a metal retaining screen wherein the adhesive acts quickly to join the frame to the screen and yet is durable over a wide temperature range and under strenuous operating conditions. Furthermore, it is recognized that it is desirable to provide economical adhering means with increased structural strength characteristics.

The present invention advantageously provides a straightforward arrangement for the preparation of a fluid treating filter having superior bonding properties at the overlapping juncture of the retaining screen and the filter frame. The present invention further provides for the preparation of a filter which utilizes a fast setting adhesive and a slow setting adhesive, the fast setting adhesive bonding the filter frame with filter media retaining screens for assembly and packaging while maintaining this bond until the slow setting adhesive develops its bond, the slow setting adhesive having strong structural characteristics and permanent bonding under strenuous handling and operating conditions over a wide temperature range. The present invention even further provides for the preparation of a filter requiring less fast setting adhesive than heretofore used.

It has been found that by preparing a filter utilizing a fast setting adhesive and a slow setting adhesive the bonding characteristics of filter media metal retaining screens with a filter frame have been greatly improved. Furthermore, with the adhesives, as hereinafter described, the problem of the filter frame loosening from the metal retaining screens in operation of the fluid treating filter has been virtually eliminated. Also, it has been found that by using a slow setting adhesive with a fast setting adhesive, the economics of the use of the slow setting adhesive is more than offset by the reduction of the amount of fast setting adhesive used.

Various other features of the present invention will become obvious to those skilled in the art upon reading the disclosure set forth hereinafter.

More particularly, the present invention provides a fluid treating filter comprising a filter frame and at least two retaining screens, with filter media disposed therebetween, the retaining screens being in parallel and having edges in communicative relation with the filter frame; and a fast setting adhesive and a slow setting adhesive being disposed at the juncture of at least one of the retaining screens with the filter frame whereby the fast and the slow setting adhesives attach the filter frame to the retaining screen.

It is to be understood that the description of the example of the present invention given hereinafter is not by way of limitation and various modifications within the scope of the present invention will occur to those skilled in the art upon reading the disclosure set forth hereinafter.

Figure 2:
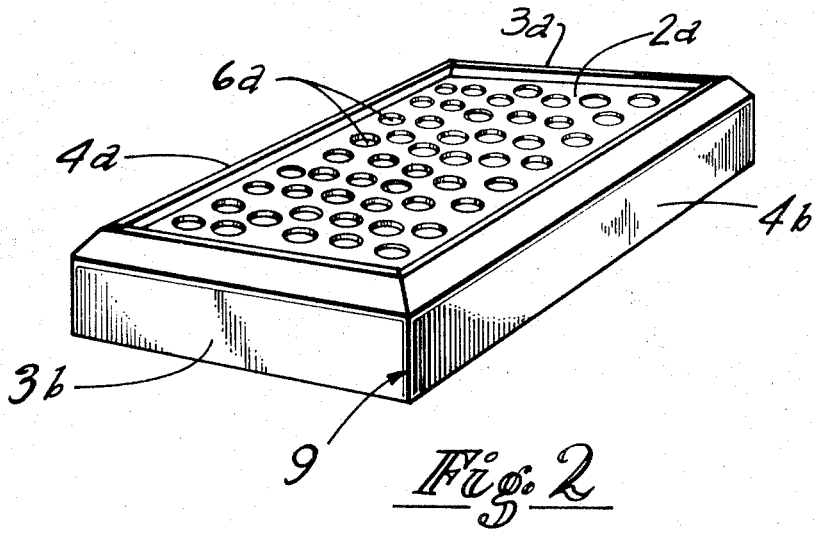

Referring to the drawings:

FIG. 1 is an exploded perspective view of a filter of the present invention; and FIG. 2 is a perspective view of the filter of FIG. 1.

As can be seen in FIG. 1 of the drawing, the fluid treating filter of the present invention includes retaining screens 2a and 2b having a plurality of flow-through apertures 6a and 6b, respectively, disposed therein, with filter media 1 disposed therebetween. Opposed channel shaped ends 3a and 3b (FIG. 2) and opposed channel shaped sides 4a and 4b make up the filter frame 9 (FIG. 2) which surround and enclose the retaining screens 2a and 2b with the filter media 1 disposed therebetween.

Channel shaped end 3a includes two opposed leg portions 11a and 11b, and a base portion 11c disposed therebetween, legs 11a and 11b having on their inner faces fast setting adhesives 7a and 7b, respectively, and slow setting adhesives 8a and 8b, respectively, attached thereto for adhering end 3a to coextensive edges of screens 2a and 2b. Fast setting adhesives 7a and 7b are added in strips to the inner faces of legs 11a and 11b generally adjacent the juncture of legs 11a and 11b with base 11c whereas the slow setting adhesive 8a and 8b are added in strips to the inner faces of legs 11a and 11b generally along the extreme edge of the legs 11a and 11b. The addition of the slow setting adhesives 8a and 8b along the edge of the legs 11a and 11b generally yields a better bond between the end 3a and the retaining screens 2a and 2b as there is less bending moment in the interior of the filter than around the edges.

Channel shaped side 4a includes two opposed leg portions 12a and 12b, and a base portion 12c disposed therebetween, legs 12a and 12b having on their inner faces fast setting adhesives 7c and 7d, respectively, and slow setting adhesives 8c and 8d, respectively, attached thereto for adhering side 4a to coextensive edges of screens 2a and 2b.

Opposing channel shaped end 3b and opposing channel shaped side 4b are also provided with fast and slow setting adhesive (not shown) on the inner faces of inwardly extending legs in the same manner as described above for the end 3a and side 4a.

The fast setting adhesives utilized in the present invention are those known as "hot melts," "hot melts" being the term applied to those thermoplastic adhesives that flow at elevated temperatures, such as 350°F, but upon chilling harden and become tacky. These include, for example, hide glues, bone glues, polyethylene base binders, polypropylene base binders, ethylene vinyl acetate binders, and the like.

The slow setting adhesives used in the present invention are those known as "cold adhesives," "cold adhesives" being the term applied to those adhesives that are applied at room temperature and after a period of time develop adhesive properties. These include solvent dispersion and emulsion type adhesives having glue lines that do not open up or shatter in a temperature range of from about −10°F to about 140°F. The solvent dispersion and emulsion type adhesives include adhesives from bases, such as synthetic rubber, natural rubber, polyvinyl acetate, and the like.

In the preparation of fluid treating filters of the present invention, fibrous material 1 of low density and permeability, such as glass fibrous material, is placed between metal retaining screens 2a and 2b. Hot-melt or fast setting adhesive 7 and cold or slow setting adhesive 8 are applied to the inner faces of the legs extending from the channel ends 3 and sides 4 in strips at the positions mentioned previously. The legs of ends 3 and sides 4 are then placed in overlapping relationship with coextensive edges of screens 2a and 2b completely enclosing the retaining screens 2a and 2b with the filter media 1 disposed therebetween. Pressure is applied to the outer faces of the legs of the channel shaped ends 3 and sides 4 for a period sufficient to allow the hot melt adhesive 7 to chill and adhere to the edges of the retaining screens 2a and 2b. The fast setting or hot melt adhesive insures the holding of the channel shaped filter frame ends 3 and sides 4 in adhering relationship with the retaining screens 2a and 2b until the cold or slow setting adhesive develops its bond.

It will be realized that various changes may be made to specific embodiments shown and described without departing from the principles and spirit of the invention.

What I claim is:

1. A fluid treating filter comprising a filter frame and at least two retaining screens with filter media disposed therebetween, said retaining screens being parallel and having edge portions in contact relation with said filter frame; and a fast setting adhesive having an adhesive base selected from the group consisting of bone glues, hide glues, polyethylene base, polypropylene base, and ethlene vinyl acetate and a slow setting adhesive having an adhesive base selected from the group consisting of synthetic rubber, natural rubber, and polyvinyl acetate disposed in seperate portions between said retaining screens with said filter frame edge portions whereby said fast and said slow setting adhesive attach said filter frame to said retaining screens.

2. The filter of claim 1 wherein said filter frame includes two channel shaped sides and two channel shaped ends.

3. The filter of claim 2 wherein each of said channel shaped sides and ends includes two opposing leg portions and a base portion disposed therebetween.

4. The filter of claim 3, said fast setting adhesive being attached to the inner faces of said legs adjacent the juncture of said legs and said base, and said slow setting adhesive being attached to the inner faces of said legs at the extremity of said legs in attaching said sides and ends in overlapping relationship with said retaining screens.

5. The filter of claim 4 wherein said retaining screens are of bottle cap residue.

6. The filter of claim 4 wherein said channel shaped sides and ends are chipboard.

* * * * *